US010179522B2

(12) United States Patent
Aktas (10) Patent No.: US 10,179,522 B2
(45) Date of Patent: Jan. 15, 2019

(54) NET BUILD PROCESS FOR SEATING SUBASSEMBLY (71) Applicant: Ford Global Technologies, LLC, Dearborn, MI (US)

(72) Inventor: Macit Aktas, Windsor (CA)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/875,672

(22) Filed: Jan. 19, 2018

(65) Prior Publication Data
US 2018/0141472 A1 May 24, 2018

Related U.S. Application Data (62) Division of application No. 14/967,454, filed on Dec. 14, 2015, now Pat. No. 9,908,442.

(51) Int. Cl.
| *B60N 2/00* | (2006.01) |
| *B60N 2/22* | (2006.01) |
| *F16M 13/02* | (2006.01) |
| *B60N 2/20* | (2006.01) |
| *B60N 2/06* | (2006.01) |
| *B23K 101/00* | (2006.01) |

(52) U.S. Cl.
CPC ............ *B60N 2/22* (2013.01); *B60N 2/06* (2013.01); *B60N 2/20* (2013.01); *F16M 13/02* (2013.01); *B23K 2101/006* (2018.08)

(58) Field of Classification Search
CPC .... B60N 2/071; B60N 2/0806; B60N 2/0722; B60N 2/08; B60N 2/0881; B60N 2/073; B60N 2/1615

USPC .......... 248/424, 429, 430; 29/428, 434, 437; 297/344.1

See application file for complete search history.

(56) References Cited

U.S. PATENT DOCUMENTS

| 3,880,464 A | 4/1975 | Murphy et al. |
| 4,606,577 A | 8/1986 | Hirama et al. |
| 4,619,031 A | 10/1986 | Loewe et al. |
| 5,642,563 A | 7/1997 | Bonnett |
| 6,098,265 A | 8/2000 | Stojkovic et al. |
| 6,572,065 B2 | 6/2003 | Koga et al. |
| 6,691,392 B2 | 2/2004 | Savoy et al. |
| 7,832,806 B2 | 11/2010 | Yamada |
| 8,376,306 B2 | 2/2013 | Dowty |
| 9,511,693 B2 | 12/2016 | Nakagawa et al. |
| 2002/0094169 A1 | 7/2002 | Benator et al. |
| 2004/0070250 A1 | 4/2004 | Cooley et al. |
| 2005/0116132 A1* | 6/2005 | Sakamaki ............ B60N 2/0232 248/424 |
| 2007/0108360 A1* | 5/2007 | Ito .......................... B60N 2/067 248/424 |
| 2009/0056403 A1 | 3/2009 | Chanko |

(Continued)

*Primary Examiner* — Steven M Marsh
(74) *Attorney, Agent, or Firm* — Vichit Chea; Price Heneveld LLP (57) ABSTRACT

A vehicle seat subassembly includes a first bracket and a second bracket rotatably coupled with the first bracket. First and second pins are welded to the first bracket, and an alignment plate is welded to the second bracket. First and second datum points along the alignment plate are positioned at first and second reference dimensions from the first pin and the second pin, respectively, when the second bracket is in a reference position with respect to the first bracket.

14 Claims, 8 Drawing Sheets

(56) References Cited

U.S. PATENT DOCUMENTS

2010/0320352 A1* 12/2010 Weber .................... B60N 2/067
                                                           248/429

* cited by examiner

NET BUILD PROCESS FOR SEATING SUBASSEMBLY

FIELD OF THE INVENTION

This application is a division of and claims priority to U.S. patent application Ser. No. 14/967,454(now U.S. Pat. No. 9,908,442), filed Dec. 14, 2015, entitled "NET BUILD PROCESS FOR SEATING SUBASSEMBLY," the entirety of which is incorporated herein by reference.

FIELD OF THE INVENTION

The present invention generally relates to a method for assembling a vehicle seat component or subassembly. In particular, an easy-entry articulating seatback subassembly is assembled using a single base fixture in a net building process.

BACKGROUND OF THE INVENTION

Various types of vehicle seats are designed to implement various adjustment modes, including sliding longitudinally within the associated vehicle, along with reclining of the seatback with respect to the base of the seat. Vehicle seats intended for certain locations within a vehicle may further be able to implement an easy entry mode, allowing a single action to both move the seat to a forward-most position within the vehicle, while simultaneously angling the seatback forward with respect to the base. Various mechanisms and subassemblies can be included in the seat to both achieve such movement and to maintain the seat in the resulting position until a user desires the seat to be returned to the original configuration. Such mechanisms may require accurate relative locations of the various components such that the timing of the various relative movements is correct and such that various features engage or disengage, as desired. Various assembly methods requiring multiple stages and movement of in-process subassemblies between different fixtures for the assembly of specific components can introduce tolerance stackups, resulting in inaccurate positioning of components and unreliable operation of the mechanism. Accordingly, further advances may be desired.

SUMMARY OF THE INVENTION

According to one aspect of the present invention, a vehicle seat subassembly includes a first bracket and a second bracket rotatably coupled with the first bracket. First and second pins are welded to the first bracket, and an alignment plate is welded to the second bracket. First and second datum points along the alignment plate are positioned at first and second reference dimensions from the first pin and the second pin, respectively, when the second bracket is in a reference position with respect to the first bracket.

According to another aspect of the present invention, a vehicle seat includes a cushion, a seatback, and a mounting subassembly. The mounting assembly includes a first bracket fixedly coupled with the cushion and a second bracket rotatably coupled with the first bracket and fixedly coupled with the seatback. First and second pins are welded to the first bracket, and an alignment plate is welded to the second bracket. First and second datum points along the alignment plate are positioned at first and second reference dimensions from the first pin and the second pin, respectively, the first and second bracket defining a reference angle therebetween.

These and other aspects, objects, and features of the present invention will be understood and appreciated by those skilled in the art upon studying the following specification, claims, and appended drawings.

DETAILED DESCRIPTION OF THE PREFERRED EMBODIMENTS

Figure 1:
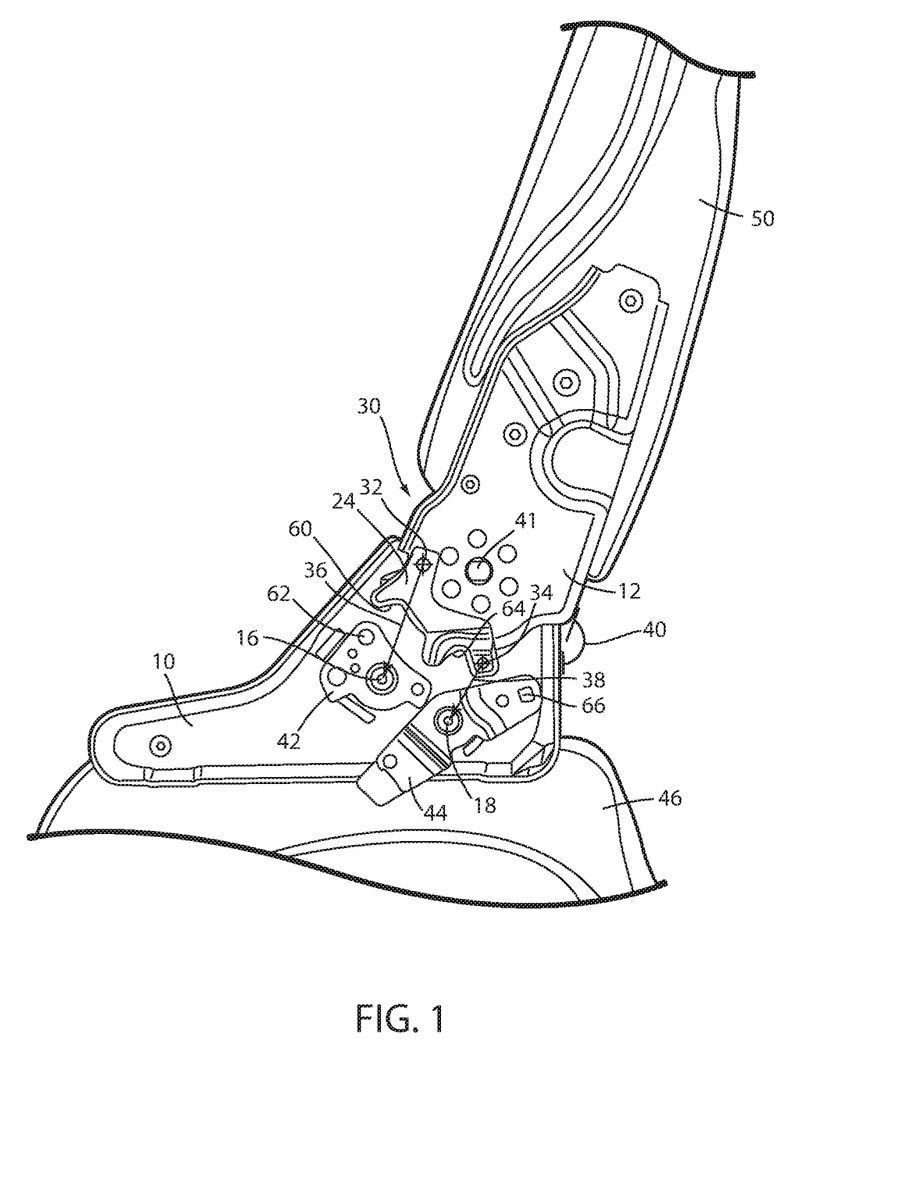
FIG. 1 is a front elevational view of a vehicle seat subassembly, shown in place on a partial vehicle seat frame.

For purposes of description herein, the terms "upper," "lower," "right," "left," "rear," "front," "vertical," "horizontal," "interior," "exterior," and derivatives thereof shall relate to the invention as oriented in FIG. 1. However, it is to be understood that the invention may assume various alternative orientations, except where expressly specified to the contrary. It is also to be understood that the specific devices and processes illustrated in the attached drawing, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise. Additionally, unless otherwise specified, it is to be understood that discussion of a particular feature of component extending in or along a given direction or the like does not mean that the feature or component follows a straight line or axis in such a direction or that it only extends in such direction or on such a plane without other directional components or deviations, unless otherwise specified.

Referring to FIGS. 1-9, reference numeral 8 generally designates a vehicle seat subassembly. Subassembly 8 includes a first bracket 10 and a second bracket 12 rotatably coupled with the first bracket 10. A first pivot pin 16 and a second pivot pin 18 are welded to the first bracket 10. An alignment plate 24 is welded to the second bracket 12 with a first datum point 32 and a second datum point 34 along alignment plate 24 are positioned at a first reference distance 36 and a second reference distance 38 from the first pivot pin 16 and the second pivot pin 18, respectively, when the second bracket 12 is in a reference position (e.g. at reference angle 40) with respect to the first bracket 10.

Figure 6:
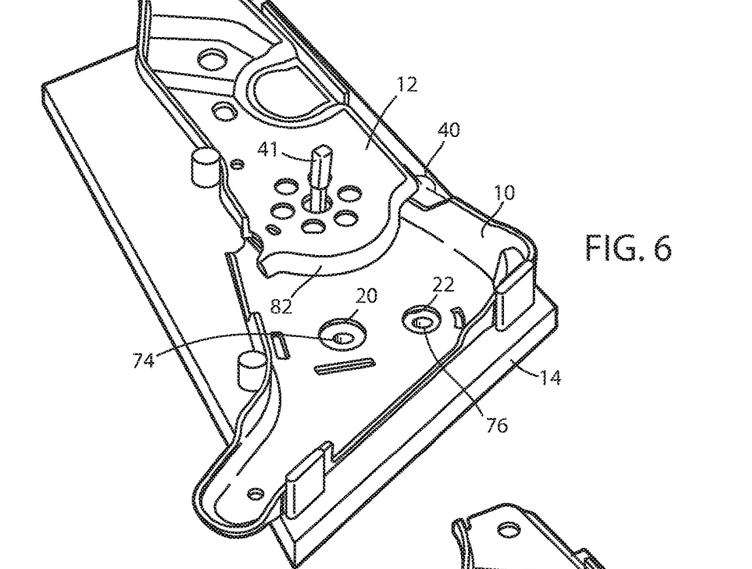
FIGS. 6-8 are front perspective views of an in-process subassembly during various stages of a fabrication process therefor.
Figure 10:
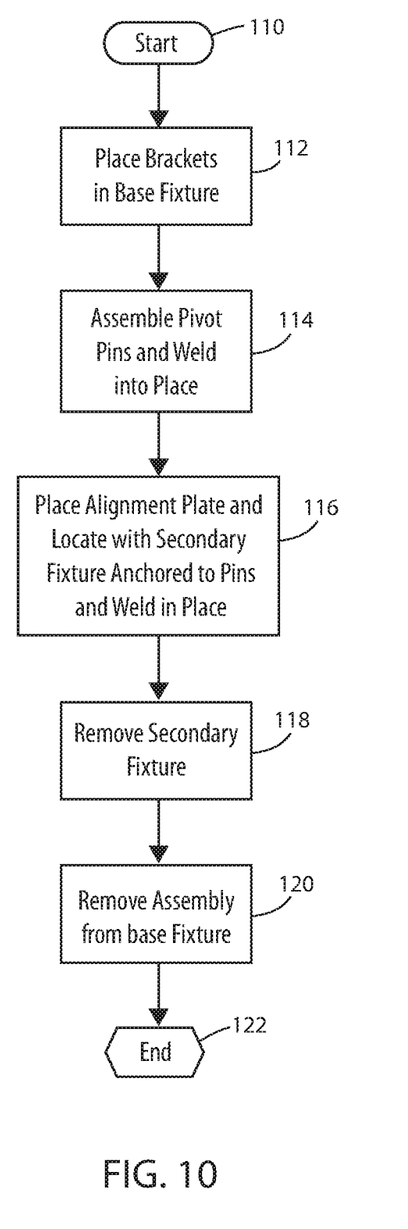
FIG. 10 is a flowchart depicting a method for fabricating the subassembly of FIG. 1.

Referring to FIG. 10, a method for assembling a vehicle seat component, such as subassembly 8, includes positioning the first bracket 10 and the second bracket 12, in a base fixture 14 (FIG. 6). With the first bracket 10 and second bracket 12 in the base fixture 14, the first pivot pin 16 and the second pivot pin 18 are welded into respective apertures 20, 22 in first bracket 10 (FIG. 7), alignment plate 24 is positioned in a location on the second bracket 12 using a secondary fixture 26 (FIG. 8) engaging with the first pivot pin 16 and the second pivot pin 18, and alignment plate 24 is welded to the second bracket 12. As explained further herein, the above-described method is useful in producing the disclosed subassembly 8, as in one embodiment, the base fixture 14 can retain second bracket 12 in a position with respect to first bracket 10 such that second bracket 12 is rotationally positioned at the reference angle 40 with respect to first bracket 10. While in such a position, the secondary fixture 26 can be used to place alignment plate 24 in a position such that the first datum point 32 is at the first reference distance 36 from first pivot pin 16 and the second datum point 34 is at the second reference distance 38 from the second pivot pin 18.

With additional reference to FIGS. 2A-2D, the thusly assembled subassembly 8 can be included in a vehicle seat 28, such as a middle-row seat in a three-row seating arrangement in a vehicle having four doors. Similarly, vehicle seat 28 can be a driver or front passenger seat in a vehicle with two rows of seating and two doors (i.e. a "two-plus-two" vehicle). In particular, first bracket 10 may be coupled with a seat base frame 46 or other similar structure (depending on the particular construction of seat 28). A seat back frame 50, or similar structure, can be coupled with second bracket 12 such that the rotational movement of second bracket 12 with respect to first bracket 10 can facilitate rotation of seat back 52 with respect to seat base 48. Such rotation can be in one of two modes, the first such mode being regular reclining or declining of seat back 52 with respect to seat base 48, which is implemented by recliner mechanism 41 selectively allowing and preventing such movement upon manipulation of recline lever 54.

Figure 2A:
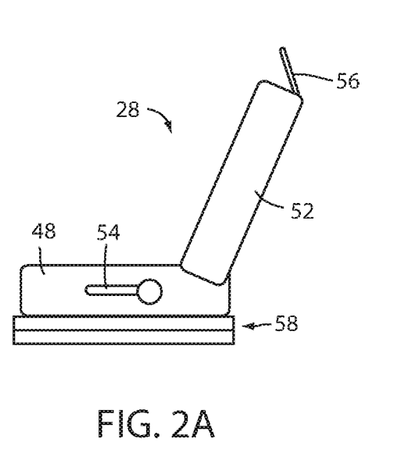
FIGS. 2A-2D are side views of a vehicle seat in various stages of an easy-entry movement mode facilitated by the subassembly of FIG. 1.

A second such mode can be in an easy-entry movement, wherein seatback 52 is moved into a maximum forward (i.e. declined) position (FIG. 2B) and in which seat base 48 moves to a forward position (FIGS. 2C and 2D) along tracks 58, which couple vehicle seat 28 within the vehicle. Such a movement mode can be implemented by a user manipulating entry lever 56, such as by pulling upwardly thereon. To facilitate such movement, manipulation of entry lever 56 can cause recliner mechanism 41 to enter a secondary mode, wherein second bracket 12 is permitted to freely move forward with respect to first bracket 10, but which rearward movement of second bracket 12 (and thusly, seatback 52) is restricted to movement back to the initial position (FIG. 2A).

Similarly, track 58, which may include a sliding mechanism therein that is moveable by a motor or by a selectively releasable mechanism actuatable, for example, by a lever. Manipulation of release lever 56 may, accordingly, and through the actuation and interaction between various additional features, including portions of subassembly 8, result in track 58 becoming disengaged from such a mechanism or permit movement of base 48 along a secondary track (either according to various known mechanisms). In particular, and with reference to FIG. 3, upon manipulation of release lever 56 and the accompanying release of second bracket 12 from first bracket 10, engagement plate 42 can be released from an initial position (FIG. 1), wherein subsequent movement of seatback 52 in the forward (declining) direction, such as from the position shown in FIG. 2A to the position shown in FIG. 2B, can cause alignment plate tab 60 to catch engagement plate pin 62 (which may be facilitated by movement of engagement plate 42 into an intermediate position) and move alignment plate 24 in the indicated direction into a release position, as shown in FIG. 3. The movement of engagement plate into the release position may disengage seat base 48, as described above, for forward movement thereof along track 58, which may be under user force, by a spring force, or a combination thereof. Further, as illustrated in FIG. 1, when engagement plate 42 is in the initial position thereof, it may engage with blocking cam 44 to retain blocking cam 44 in an initial position thereof. Accordingly, when engagement plate 42 moves out of its initial position by rotation 70, blocking cam 44 can move, including under a spring-biasing force or the like, out of the initial position thereof by rotation 72.

Figure 2B:
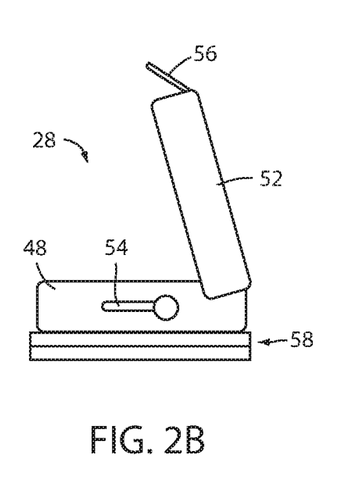
Figure 2C:
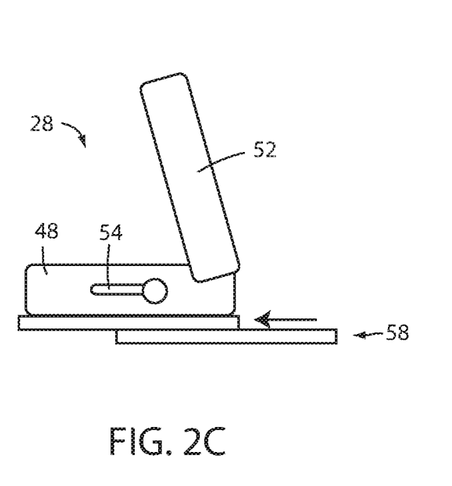
Figure 2D:
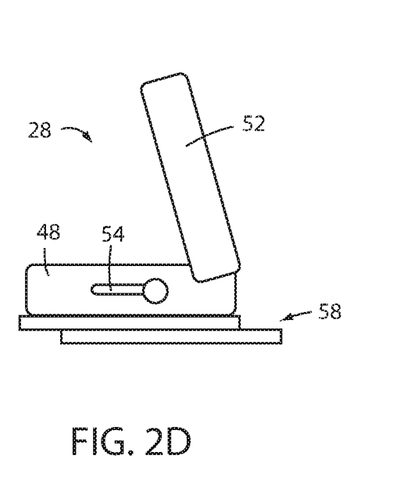
Figure 3:
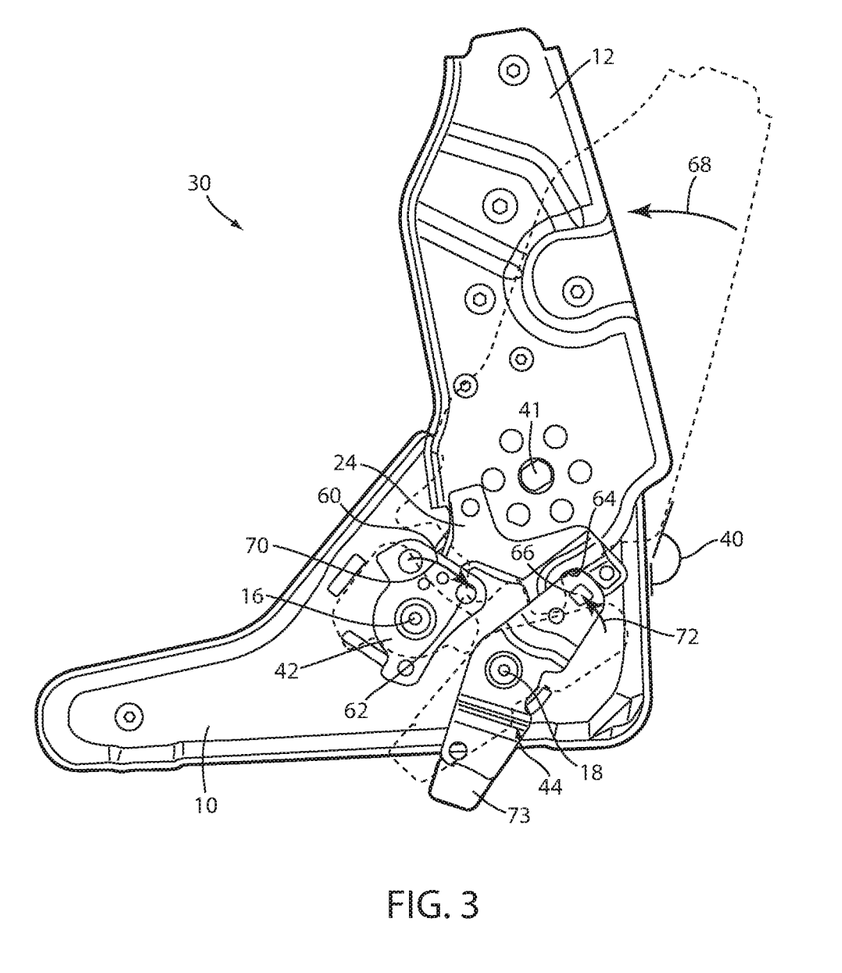
FIG. 3 is a front elevational view of the vehicle seat subassembly of FIG. 1 in an easy-entry configuration provided thereby.

Once blocking cam 44 is released from the initial position thereof and when second bracket 12 is moved by rotation 68 into the forward position shown in FIG. 3, a block 66 on one end of blocking cam 44 can engage with a notch 64 on alignment plate 24 to retain second bracket 12 and, accordingly, seatback 52 in the forward position (FIGS. 2A-2D). Seat 28 and, accordingly, subassembly 8 may, thusly, remain in the respective positions illustrated in FIGS. 2D and 3 to facilitate entry into the associated vehicle by passing behind seat 28. When such entry is complete, a user can force seat 28 rearwardly, such as against the spring force previously mentioned, with blocking cam 44 continuing to second bracket 12 in the forward position. Once seat 28 has been returned to the initial fore-aft position, such as illustrated in FIG. 2B, the end 73 of blocking cam 44 opposite bock 66 can contact a catch or other feature that causes movement thereof back to the initial position, which withdraws block 66 from notch 64, thereby allowing second bracket 12 to move back to the initial position of FIG. 1 and further allowing seatback 52 to move back to the position of FIG. 2A. Movement of second bracket 12 back toward the initial position also allows engagement plate 42 to rotate back to the initial position, which can cause track 58 to re-engage, thereby retaining seat 28 in the initial fore-aft position.

Figure 4:
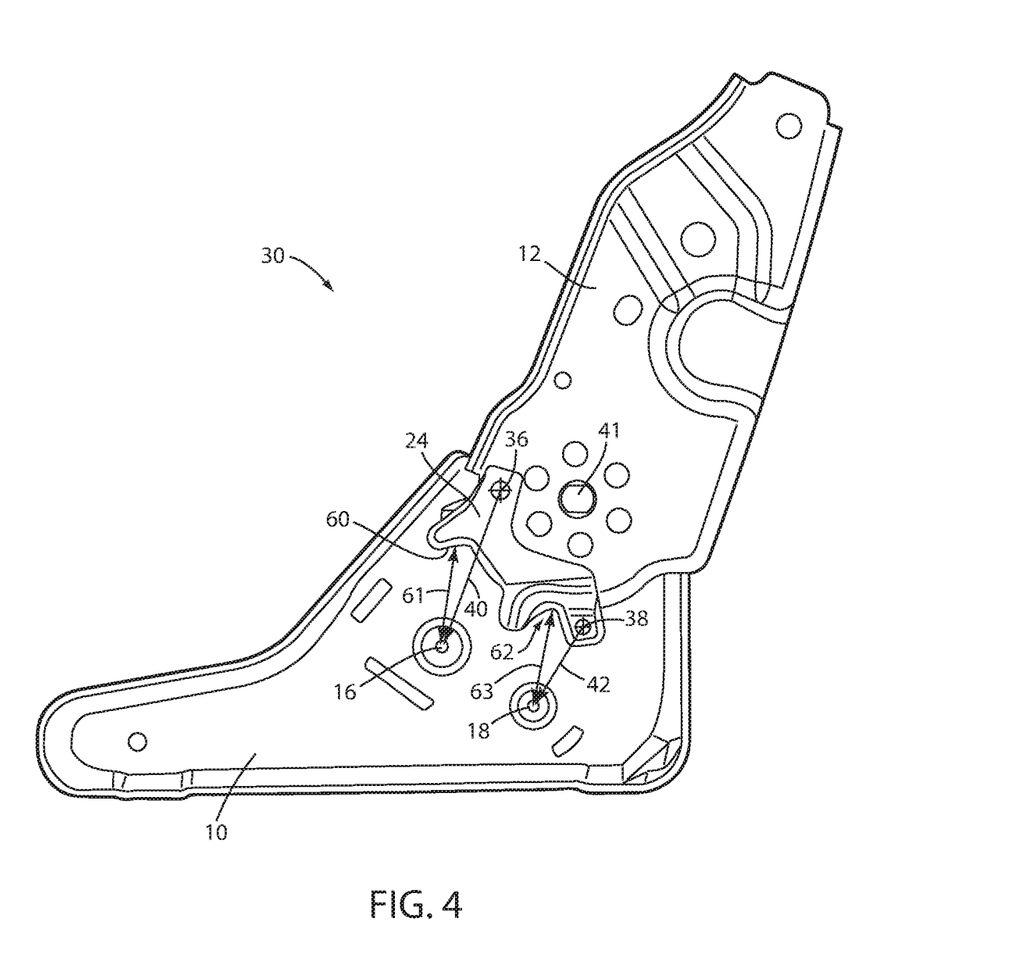
FIG. 4 is the vehicle seat subassembly of FIG. 1 with various components removed to illustrate various relative spatial relationships between other components.
Figure 5:
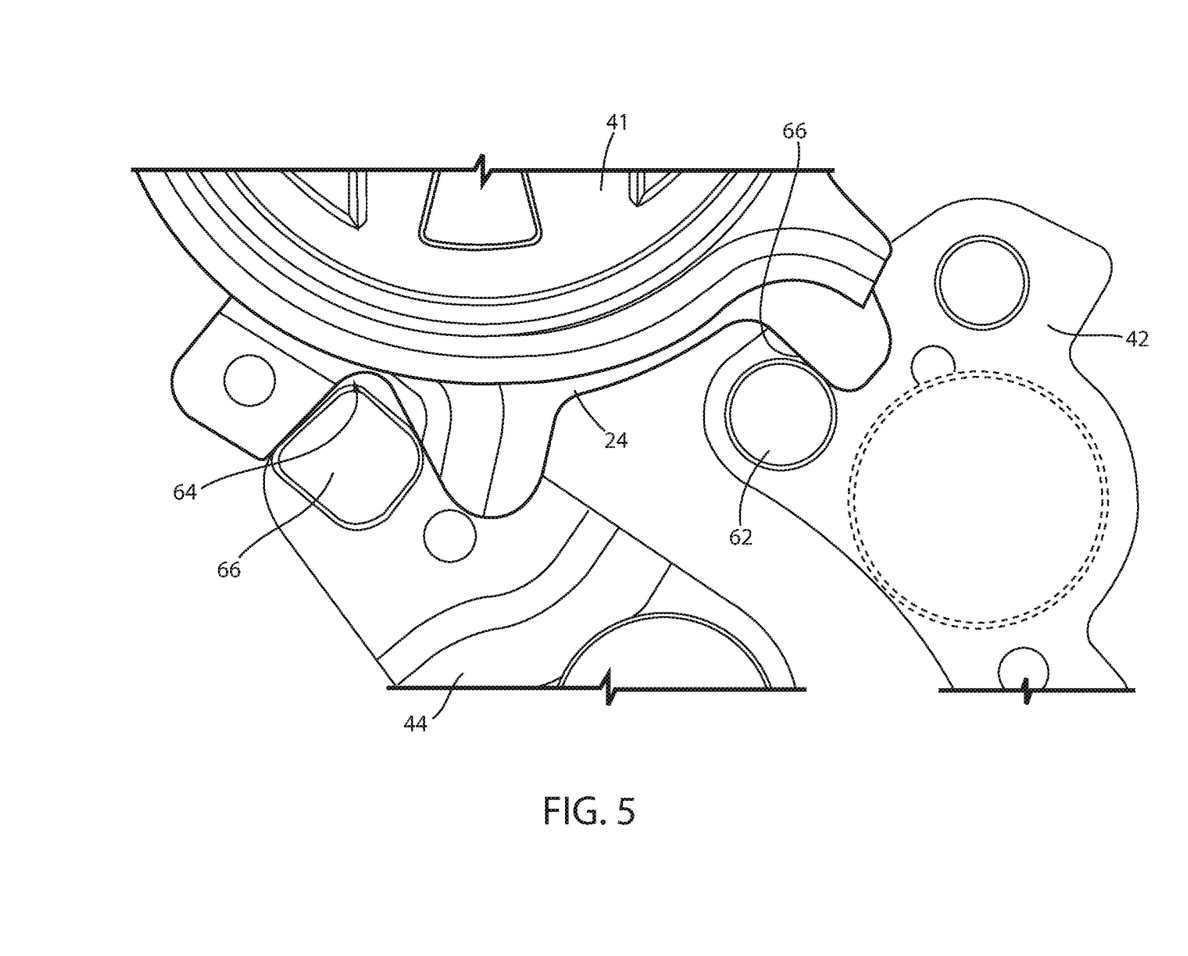
FIG. 5 is a rear elevational detail view of portions of the subassembly of FIG. 1.

Based on the above-described relative motion and interaction of components of subassembly 8, it can be seen that the relative positioning of alignment plate 24 on second bracket 12 with respect to engagement plate 42 and blocking cam 44 may be important for proper functioning of subassembly 8 within the easy-entry movement mode of the associated seat 28. In an example, if alignment plate 24 is not properly positioned, as described above, the rotational limits of engagement plate 42 may prevent block 66 from engaging with notch 64 when second bracket 12 is in the forward position of FIG. 3, thereby preventing seatback 52 from being retained in the corresponding forward position. In particular, as shown in FIG. 4, the distance 61 between first pivot pin 16 and tab 60, as well as the distance 63 between second pivot pin 18 and notch 64, are important for proper operation of the above-described functionality. As can be appreciated from the above, the particular values for distances 61 and 63 may depend on the particular configurations of engagement plate 42, blocking cam 44, and alignment plate 24, which may vary according to the construction of subassembly 8. As further illustrated in FIG. 4, the configuration of alignment plate 24 may relate distances 61 and 63 to reference distances 36 and 38, depending on the relative positioning of datum points 32 and 34 with respect to tab 60 and notch 64. In variations of alignment plate 24 using features with similar functionality, but different construction to tab 60 and notch 64, a similar relationship may be achieved based on the utilized component geometry. The interaction of the various components, including of block 66 with notch 64 and pin 62 with tab 60 is shown in further detail in FIG. 5.

With reference to FIGS. 6-9, a "net build" process for assembling the various components of subassembly 8 is described in greater detail. In particular, as shown in FIG. 6, the process can begin by placing an initial assembly of the first bracket 10 and the second bracket 12, which are rotatably coupled together by recliner mechanism 41 (or at least a portion thereof) into base fixture 14. In this sense, a first step may be to assemble the first bracket 10, second bracket 12, and the recliner mechanism 41, although in some variations, such an initial assembly may already be complete. Base fixture 14 is shown in an example form, but can vary in structure according to various considerations. In general, base fixture 14 is structured to maintain second bracket 12 in a fixed position with respect to first bracket 10, including in a fixed rotational position about the axis of recliner mechanism 41, which may be in only partial form (thereby preventing locking thereof) or may include some internal play, even when locked, that is outside the range of tolerance for subassembly 8. As previously mentioned, the fixed rotational position may be such that second bracket 12 is at the reference angle 40 with respect to second bracket 12. The reference angle 40 may correspond with, for example, the rearward-most position of second bracket 12 during the intended operation of seat 28 or another position, which may be determined based on assembly and/or tolerance conditions or analysis. Further, base fixture 14 can be structured to stably support first bracket 10 and second bracket 12, both in general and relative to each other.

Figure 7:
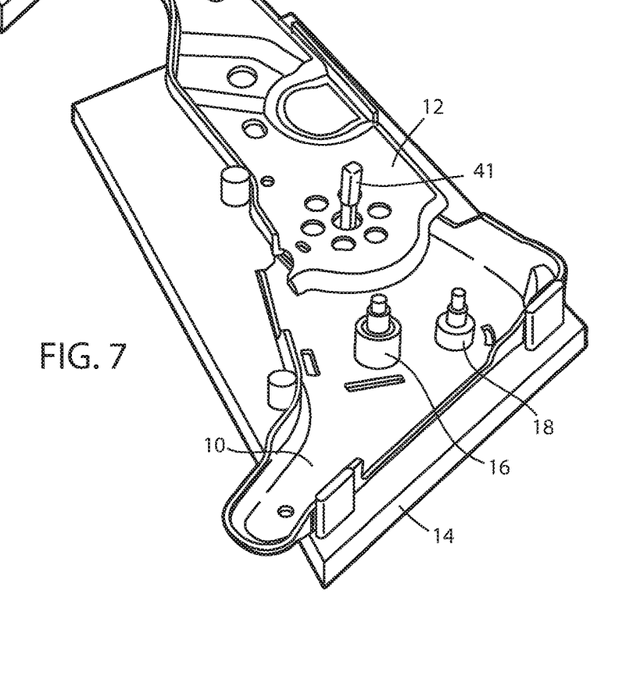

Additionally, base fixture 14 includes a first alignment aperture 74 and a second alignment aperture 76 respectively adjacent to the first aperture 20 and the second aperture 22 in first bracket 10. Alignment apertures 74 and 76 may respectively receive corresponding portions of first pivot pin 16 and second pivot pin 18 to locate pivot pins 16 and 18 relative to base fixture 14, thereby compensating for variations in the positioning of apertures 20 and 22 in first bracket 10. As such the apertures 20 and 22 in first bracket 10 may be oversized relative to the respective portions of first and second pivot pins 16 and 18 received therein to allow for positioning thereof according to base fixture 14. As shown in FIG. 7, first pivot pin 16 can be assembled with first bracket 10 by positioning thereof within aperture 20 in first bracket 10 and within alignment aperture 74 of base fixture 14. Similarly, second pivot pin 18 can be assembled with first bracket 10 by positioning thereof within aperture 20 in first bracket 10 and within alignment aperture 76 of base fixture 14. First pivot pin 16 and second pivot pin 18 can then be welded to first bracket 10 to fix the assembly therewith in the particular location dictated by the fit of first bracket 10 and first and second pivot pins 16, 18 with base fixture 14.

Figure 8:
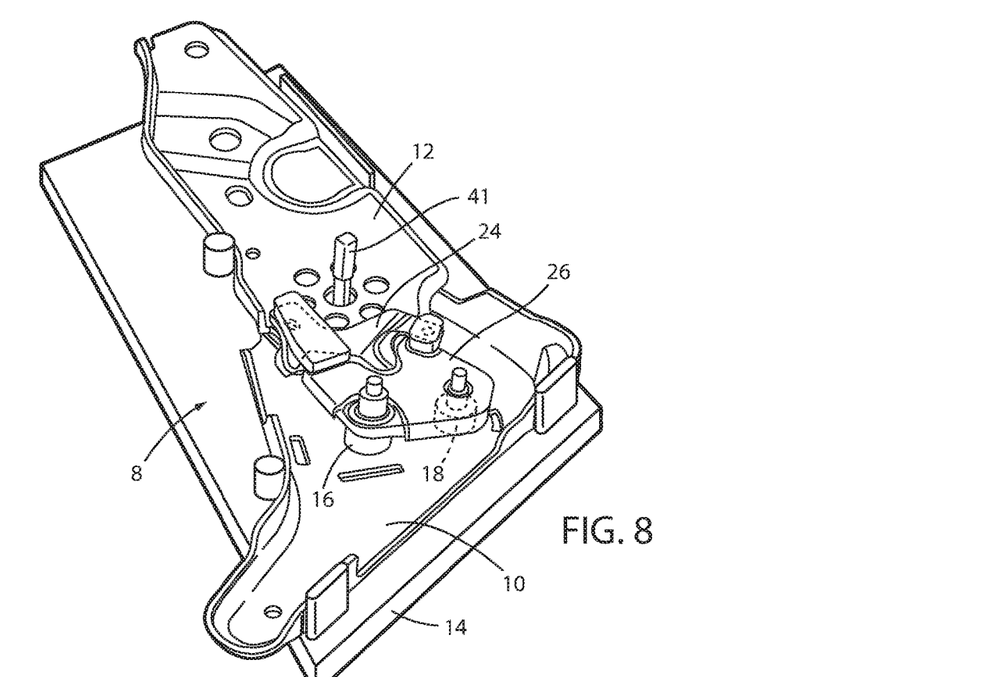
Figure 9:
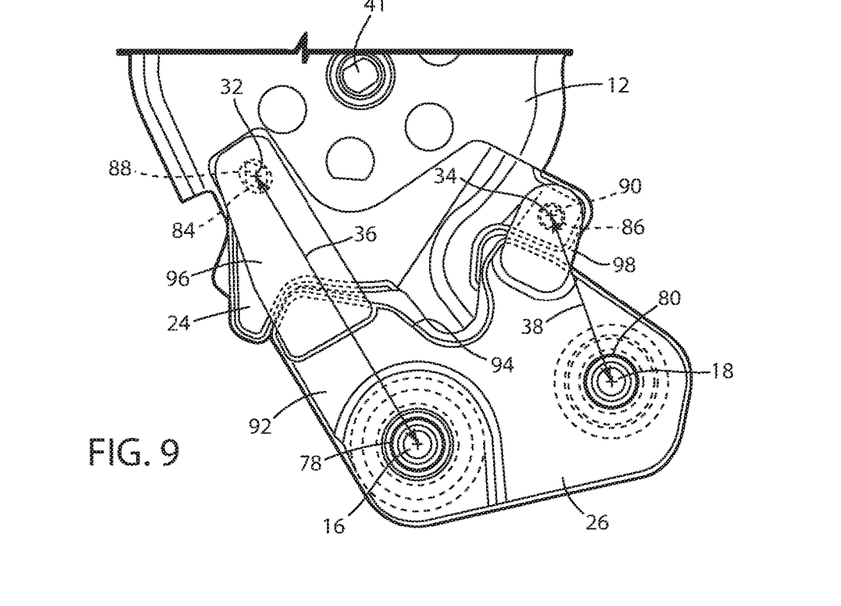
FIG. 9 is a front elevational detail view of a fixture used in connection with the subassembly during a step of fabrication thereof.

As shown in FIGS. 8 and 9, alignment plate 24 can then be assembled with second bracket 12 while the in-process subassembly 8 remains within base fixture 14. Accordingly, the temporary fixation of second bracket 12 within base fixture 14 is not only in a desired position (i.e. at the reference angle 40) with respect to first bracket 10, but further, with respect to the locations of pivot pins 16 and 18 dictated by base fixture 14. In this manner, secondary fixture 26 can be assembled onto first pivot pin 16 and second pivot pin 18 to locate alignment plate 24 with respect to the locations of first pivot pin 16 and second pivot pin 18 dictated by base fixture 14.

In the example shown in FIGS. 8 and 9, secondary fixture 26 can engage with alignment plate 24 at the first datum point 32 and the second datum point 34, which may be in the form of locating features along alignment plate 24. In particular, first datum point 32 may be in the form of a two-way locator aperture 86 and second datum point 34 may be in the form of a four-way locator aperture 86. Secondary fixture 26 may include locator pins 88 and 90 that respectively engage with the locator apertures 84 and 86. In particular, a first locator pin 88 can be in the form of an extruded, elongate diamond that fits in a fixed location within locator aperture 84 along the latitudinal and longitudinal axes thereof, while allowing for slight rotation about first datum point 32. Second locator pin 90 can be generally cylindrical so as to fit within location aperture 86, which may be generally round.

Secondary fixture 26 can include a body 92 having a profile 94 that can generally match that of alignment plate 24. Further, profile 94 can be configured to make partial contact with alignment plate 24 when locator pins 88 and 90 are engaged with locator apertures 84 and 86 (which may be positioned on respective arms 96 and 98) to provide additional locating and/or retention of alignment plate 24 with secondary fixture 26. Such an arrangement may allow for an assembly step wherein secondary fixture 26 is assembled with alignment plate 24 prior to any assembly of alignment plate 24 with second bracket 12 or of secondary fixture 26 with pivot pins 16 and 18. In such a step, the temporarily-assembled alignment plate 24 and secondary fixture 26 can then be assembled with the in-process subassembly 8 by engagement of apertures 74 and 76 of secondary fixture 26 with first pivot pin 16 and second pivot pin 18, respectively. This step, by the construction of secondary fixture 26 can bring alignment plate 24 into an appropriate position along surface 82 of second bracket 12 such that first datum point 32 is at reference distance 36 with respect to first pivot pin 16 and second datum point 34 is at reference distance 38 with respect to second pin 18 when second bracket 12 is at the reference angle 40 with respect to the first bracket 10.

In a subsequent step, alignment plate 24 is fixed with second bracket 12 by welding, as needed to achieve a desired bond therebetween. When the welding is complete, secondary fixture 26 is removed and the completed subassembly 8 is removed from base fixture 14. With alignment plate 24 being positioned on second bracket 12 such that the above-described relationship among features is realized when second bracket 12 is at the reference angle 40 with respect to first bracket 10. As explained above, this relationship can offer improved alignment of engagement plate 42 and blocking cam 44 with alignment plate 24 during operation thereof It is noted that, as can be seen in FIGS. 6 and 7, the surface 82 of second bracket 12 with which alignment plate 24 is assembled may be free from any features that position alignment plate 24 therewith or otherwise restrict the positioning of alignment plate 24 therealong. By this arrangement, the locating of alignment plate 24 on surface 82 is achieves solely by the above-described assembly of secondary fixture 26 on pivot pins 16 and 18.

The above described method of assembly may be generally summarized by the process depicted schematically in FIG. 10, in which after any necessary preliminary steps, the process starts (step 110) by first placing first bracket 10 and second bracket 12 in base fixture 14 (step 112). As discussed above, first bracket 10 and second bracket 12 may first be rotatably coupled together, including by way of recliner mechanism 41. Subsequently, pivot pins 16 and 18 are assembled with first bracket 10, such as by engagement with apertures 74 and 76 within base fixture 14, and are welded into place on first bracket 10 (step 114). Pivot pins 16 and 18 are then used as anchor points for secondary fixture 26, which is assembled therewith to position alignment plate 24 on second bracket 12 (step 116). Alignment plate 24 is then welded to second bracket 12 before removal of secondary fixture 26 (step 118) and removal of the resulting subassembly 120 from base fixture 14. The subassembly 8 is then completed (step 122). Additional steps may include assembling engagement plate 42 with first pivot pin 16 and blocking cam 44 with second pivot pin 18.

It is to be understood that variations and modifications can be made on the aforementioned structure without departing from the concepts of the present invention, and further it is to be understood that such concepts are intended to be covered by the following claims unless these claims by their language expressly state otherwise.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the invention as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present invention. The exemplary structures and processes disclosed herein are for illustrative purposes and are not to be construed as limiting.

What is claimed is:

1. A vehicle seat subassembly, comprising:
    a first bracket;
    a second bracket rotatably coupled with the first bracket;
    first and second pins welded to the first bracket;
    an alignment plate welded to the second bracket, wherein first and second datum points along the alignment plate are positioned at first and second reference dimensions from the first pin and the second pin, respectively, the first and second bracket defining a reference angle therebetween; and
    an engagement plate rotatably coupled with the first pin and a blocking cam rotatably engaged with the second pin.

2. The vehicle seat subassembly of claim 1, wherein the first reference dimension and the second reference dimension are based on relative configurations of the engagement plate, the blocking cam, and the alignment plate to permit operative engagement thereof under a use condition of the subassembly including rotation of the second bracket out of the reference position with respect to the first bracket.

3. The vehicle seat subassembly of claim 1, wherein the first reference dimension is between the first pin and a first location feature of the alignment plate and the second reference dimension is between the second pin and a second location feature of the alignment plate.

4. The vehicle seat subassembly of claim 1, wherein the first bracket and the second bracket are rotatably coupled together by a seatback recliner mechanism.

5. The vehicle seat subassembly of claim 1, wherein the second bracket is retained in a fixed rotational position with respect to the alignment plate by the alignment plate being welded to the second bracket.

6. The vehicle seat subassembly of claim 1, further including:
    an engagement plate assembled with the first pin; and
    a blocking cam assembled with the second pin.

7. The vehicle seat subassembly of claim 6, wherein the alignment plate is positioned on the second bracket with respect to the first and second pins based on relative configurations of the engagement plate, the blocking cam, and the alignment plate to facilitate operative engagement thereof under a use condition of the subassembly including rotation of the second bracket with respect to the first bracket.

8. A vehicle seat, comprising:
    a cushion;
    a seatback;
    a mounting subassembly, comprising:
        a first bracket fixedly coupled with the cushion;
        a second bracket rotatably coupled with the first bracket and fixedly coupled with the seatback;
        first and second pins welded to the first bracket; and
        an alignment plate welded to the second bracket, wherein first and second datum points along the alignment plate are positioned at first and second reference dimensions from the first pin and the second pin, respectively, the first and second bracket defining a reference angle therebetween;
    an engagement plate assembled with the first pin; and
    a blocking cam assembled with the second pin.

9. The vehicle seat of claim 8, wherein the engagement plate and the blocking cam are included in the mounting mechanism.

10. The vehicle seat of claim 8, wherein the first reference dimension and the second reference dimension are based on relative configurations of the engagement plate, the blocking cam, and the alignment plate to permit operative engagement thereof under a use condition of the subassembly including rotation of the second bracket out of the reference position with respect to the first bracket.

11. The vehicle seat of claim 8, wherein the first reference dimension is between the first pin and a first location feature of the alignment plate and the second reference dimension is between the second pin and a second location feature of the alignment plate.

12. The vehicle seat of claim 8, further including a seatback recliner mechanism, wherein the first bracket and the second bracket are rotatably coupled together by the seatback recliner mechanism.

13. The vehicle seat of claim 8, wherein the second bracket is retained in a fixed rotational position with respect to the alignment plate by the alignment plate being welded to the second bracket.

14. The vehicle seat of claim 8, wherein the alignment plate is positioned on the second bracket with respect to the first and second pins based on relative configurations of the engagement plate, the blocking cam, and the alignment plate to facilitate operative engagement thereof under a use condition of the subassembly including rotation of the second bracket with respect to the first bracket to facilitate rotation of the seatback with respect to the cushion.

* * * * *